US012302077B2

(12) United States Patent
Rousseau

(10) Patent No.: US 12,302,077 B2
(45) Date of Patent: May 13, 2025

(54) LOUDSPEAKER SPIDERS

(71) Applicant: B&W Group Ltd., Worthing (GB)

(72) Inventor: Martial Rousseau, Worthing (GB)

(73) Assignee: B&W GROUP LTD., Worthing (GB)

( * ) Notice: Subject to any disclaimer, the term of this patent is extended or adjusted under 35 U.S.C. 154(b) by 209 days.

(21) Appl. No.: 17/774,560

(22) PCT Filed: Nov. 2, 2020

(86) PCT No.: PCT/GB2020/052768
§ 371 (c)(1),
(2) Date: May 5, 2022

(87) PCT Pub. No.: WO2021/089990
PCT Pub. Date: May 14, 2021

(65) Prior Publication Data

US 2022/0394391 A1 Dec. 8, 2022

(30) Foreign Application Priority Data

Nov. 8, 2019 (GB) ..................................... 1916280

(51) Int. Cl.
*H04R 25/00* (2006.01)
*H04R 1/02* (2006.01)
(Continued)

(52) U.S. Cl.
CPC ............. *H04R 9/043* (2013.01); *H04R 1/025* (2013.01); *H04R 7/12* (2013.01); *H04R 9/06* (2013.01);
(Continued)

(58) Field of Classification Search
CPC .. H04R 1/025; H04R 2400/11; H04R 31/006; H04R 7/12; H04R 7/18; H04R 9/025; H04R 9/043; H04R 9/06
(Continued)

(56) References Cited

U.S. PATENT DOCUMENTS

2004/0001603 A1 1/2004 Sahyoun
2005/0111689 A1 5/2005 True
(Continued)

FOREIGN PATENT DOCUMENTS

EP 3410741 12/2018
GB 2392795 4/2006
(Continued)

OTHER PUBLICATIONS

International Search Report for PCT/GB2020/052768 dated Nov. 2, 2020.
(Continued)

*Primary Examiner* — Phylesha Dabney
(74) *Attorney, Agent, or Firm* — Nieves IP Law Group, LLC; Peter A. Nieves

(57) ABSTRACT

A loudspeaker (1) comprising a diaphragm (2), a voice coil (10) mounted on the diaphragm (2) to move with the diaphragm (2), a chassis (4), and a spider (20) is disclosed. The spider (20) extends across a gap between the chassis (4) and the voice coil (10) and comprises a plurality of legs (36), each leg (36) extending radially across at least a portion of the gap. The diaphragm (2) is configured to move from a neutral position to an extended position. When the diaphragm (2) is in the neutral position the cross-sectional shape of each leg (36) follows a line which varies in height with respect to a reference plane, said line comprising first, second and third curves, the second curve being located in between the first and third curves. Either the first and third curves are convex and the second curve is concave, or the first and third curves are concave and the second curve is convex. Thus, the spider (20) may have legs (36) having an 'm' or 'w' shaped profile in at least one region of the leg (36).

15 Claims, 7 Drawing Sheets

(51) Int. Cl.

| | |
|---|---|
| ***H04R 7/12*** | (2006.01) |
| ***H04R 9/04*** | (2006.01) |
| ***H04R 9/06*** | (2006.01) |
| ***H04R 31/00*** | (2006.01) |
| *H04R 7/18* | (2006.01) |
| *H04R 9/02* | (2006.01) |

(52) U.S. Cl.
CPC ............. *H04R 31/006* (2013.01); *H04R 7/18* (2013.01); *H04R 9/025* (2013.01); *H04R 2400/11* (2013.01)

(58) Field of Classification Search
USPC .......................................................... 381/404
See application file for complete search history.

(56) References Cited

U.S. PATENT DOCUMENTS

| | | | |
|---|---|---|---|
| 2009/0296978 | A1 | 12/2009 | Kamimura et al. |
| 2011/0243364 | A1 | 10/2011 | Walter |
| 2016/0269820 | A1 | 9/2016 | Rousseau et al. |

FOREIGN PATENT DOCUMENTS

| | | | | | |
|---|---|---|---|---|---|
| JP | H09275598 | | | 10/1987 | |
| JP | H05103395 | A | | 4/1993 | |
| KR | 20120007364 | | | 1/2012 | |
| WO | WO-03101149 | A1 | * | 12/2003 | ............... H04R 1/06 |
| WO | 2006055801 | | | 5/2006 | |
| WO | 2023215856 | A1 | | 11/2023 | |

OTHER PUBLICATIONS

GB Search Report for application GB1916280.9 dated Apr. 22, 2020.

Alpine Type-R Thin Subwoofer Application Guide, SWR-T12/SWR-T10 Subwoofer, downloaded Nov. 14, 2019.

Alpine SWR-T12 Product Overview, www.alpine-usa.com/product/swr-t12, downloaded Nov. 13, 2019.

United Kingdom Intellectual Property Office, Search Report for Patent Application No. GB2314562.6, Dated Nov. 24, 2023, South Wales, United Kingdom.

* cited by examiner

LOUDSPEAKER SPIDERS

CROSS-REFERENCE TO RELATED APPLICATIONS

This application is the National Stage of International Application No. PCT/GB2020/052768, filed Nov. 2, 2020, which claims the benefit of United Kingdom Patent Application No. 1916280.9 filed Nov. 8, 2019. The contents of these prior applications are incorporated by reference herein in their entirety.

FIELD OF THE INVENTION

The present invention concerns improvements in and relating to loudspeakers. More particularly, but not exclusively, this invention concerns an improved spider for a loudspeaker assembly. The invention also concerns a loudspeaker assembly including such a spider, a loudspeaker enclosure comprising an assembly including such a spider and a method of manufacturing such a spider.

BACKGROUND OF THE INVENTION

A loudspeaker assembly typically includes a diaphragm (also known as a cone), a voice coil, a chassis (also known as a basket, frame or carrier) and a suspension via which the diaphragm and voice coil are connected to the chassis. The voice coil is typically attached to the diaphragm so that in use an electrical current is applied to the voice coil generating an electromagnetic field which interacts with the magnetic field of the driver magnet thereby causing the voice coil and consequently the diaphragm to move. Typically, the suspension comprises two parts; (i) a surround, typically a ring of flexible material, which joins the outer circumference of the diaphragm to the chassis and (ii) a spider, typically a corrugated disk of flexible material which joins the centre of the diaphragm/voice coil to the chassis. The spider provides an axial force that acts to restore the diaphragm/voice coil to a neutral position and a radial force that acts to centre the voice coil within a voice coil gap. The stiffness of the spider is an important factor in the quality of sound produced by the loudspeaker.

In early loudspeakers, the spider was made from a thin material, much of which was cut away to leave 'legs'. More recently, spiders in the form of a concentrically corrugated fabric disk which has been impregnated with a resin, for example a phenolic or acrylic resin, have become standard. However, impregnated cloth fibres exhibit strong stiffness non-linearities (i.e. variation of the stiffness of the spider in response to the degree of excursion of the diaphragm/voice coil) which are thought to be related to complex mechanical behaviour, for example dynamic friction between the cloth fibres when only partially wetted by the resin matrix. This non-linearity may be a source of distortion in the radiated sound pressure. It would be advantageous to provide a spider with a reduced degree of non-linearity.

For any particular loudspeaker design there will be a target stiffness versus excursion profile (hereafter a target stiffness/excursion curve). Accordingly, it would be advantageous to provide a form of spider that facilitates the achievement of such a target curve. Additionally or alternatively, it would be advantageous to provide a spider that provides a target stiffness/excursion curve while maintaining the radial stiffness required to centre the voice coil.

A loudspeaker assembly is typically mounted in a loudspeaker enclosure such as a loudspeaker cabinet. In many loudspeaker applications, for example portable loudspeakers and in-car loudspeakers, it is advantageous to reduce, as far as possible, the size of the loudspeaker enclosure in order to render it more portable, or to allow it to be used within a constrained space. Accordingly, it would be advantageous to provide a spider that is more compact.

The diaphragm of a loudspeaker moves backward and forward to produce sound, subjecting the spider to a high number of repetitive cycles of back and forward movement during the lifetime of a loudspeaker. This may lead to fatigue and, ultimately, failure of the spider. Accordingly, it would be advantageous to provide a spider with improved fatigue performance.

In order to maintain sound quality in use, it is desirable for the loudspeaker assembly to produce controlled vibration in the diaphragm whilst minimising, or otherwise controlling, unwanted vibration in the other elements of the loudspeaker assembly and enclosure. Accordingly, it would be advantageous to provide a spider that controls and/or reduces unwanted vibration and/or reduces the transmission of unwanted vibration between elements of the loudspeaker assembly, for example between the diaphragm/voice coil and the chassis.

WO2006/055801 discloses a loudspeaker having a plastic frame with an integrally molded spider having individual legs. The form of spider disclosed in WO 2006/05801 is complex and accordingly may be difficult and/or expensive to manufacture. Accordingly, it would be advantageous to provide a spider that is more efficient to manufacture. Additionally or alternatively, it would be advantageous to provide a spider that is more compact and/or provides improved radial stiffness than the spider of WO2006/055801.

The present invention seeks to mitigate the above-mentioned problems. Alternatively or additionally, the present invention seeks to provide an improved spider for a loudspeaker assembly.

SUMMARY OF THE INVENTION

In a first aspect of the invention there may be provided a loudspeaker assembly comprising one or more of a diaphragm, a voice coil mounted on the diaphragm to move with the diaphragm, a chassis, and a spider. It may be that the spider extends across a gap between the chassis and the voice coil. The spider may comprise a plurality of legs, each leg extending radially across at least a portion of the gap. The diaphragm may be configured to move from a neutral position to an extended position. It may be that when the diaphragm is in the neutral position the cross-sectional shape of each leg follows a line which varies in height with respect to a reference plane. It may be that said line comprises one of a convex curve and a concave curve located in between two of the other of a convex curve and a concave curve. Said line may comprise first, second and third curves, the second curve being located in between the first and third curves. It may be that the first and third curves are convex and the second curve is concave. It may be that the first and third curves are concave and the second curve is convex.

Thus, the present invention may provide a spider with legs having an 'm' or 'w' shaped profile in at least one region of the leg. Such a profile may facilitate the design of a spider with a target stiffness/excursion curve. Additionally or alternatively, a spider with legs having such a profile may provide better radial stiffness than a spider of the same material with legs having a simple roll profile. This in turn may allow a more flexible material to be used for the spider, while maintaining the ability of the spider to control and stabilise the voice coil. Additionally or alternatively, spiders in accordance with the present invention may be more compact (i.e. have a reduced axial extent or height) compared to spiders with legs having a simple roll profile and providing the same range of movement of the diaphragm. Additionally or alternatively, the shape of the legs of spiders in accordance with the present invention may provide an improved stress distribution in the leg thereby increasing the fatigue life of the spider.

It will be appreciated that, as used herein, the term 'in between' refers to the radial position of two curves, e.g. the first and third curves being on either side of a curve, e.g. the radial position of a second curve.

It will be appreciated that whether a curve is convex or concave depends on the direction from which it is observed. For the purposes of the present application, a concave curve may be defined as a curve having sides extending towards the forward (i.e. sound emitting) surface of the diaphragm from a minimum. Similarly, a convex curve may be defined as a curve having sides extending away from the forward (i.e. sound emitting) surface of the diaphragm from a maximum. For the purposes of the invention in its broadest sense, it is not necessary for a curve to be parabolic and/or symmetric although that may advantageous in some circumstances.

It may be that the line further comprises fourth, fifth and sixth curves, the fifth curve being located in between the fourth and sixth curves. It may be that either the fourth and sixth curves are convex and the fifth curve is concave, or the fourth and sixth curves are concave and the fifth curve is convex. Thus, the present invention may provide for multiple 'm' and 'w' shapes within a single leg. Such a profile may facilitate the design of a spider with a target stiffness/excursion curve.

The three curves forming an 'm' or 'w' may be referred to as a set. Thus the spider may comprise one or more sets of curves. For example, a first set of curves comprising the first, second and third curves, and a second set of curves comprising the fourth, fifth and sixth curves. Each set of curves may comprise three curves, with two curves of the same type (e.g. one of convex and concave) located either side of a curve of a different type (e.g. the other of convex and concave). Each leg may comprise one or more further sets of curves, Each set may comprise a middle curve and two end curves either side of the middle curve. For example, the first and third curves are end curves while the second curve is a middle curve.

The end curves of two sets of curves (e.g. the first, third, fourth and sixth curves) may all be of the same type i.e. one of convex or concave. The middle curves of two sets of curves (e.g. the second and fifth curves) may be of the same type i.e. the other of convex or concave. Alternatively, the end curves of a first set of curves may be of a different type to the end curves of a second set of curves. In that case, the middle curves of the two sets may also be of different types. Thus, the legs may have two 'm' shapes, two 'w' shapes or an 'm' and a 'w' shape. The shape (e.g. the amplitude, wavelength and/or profile) formed by a first set of curves may be the same as the shape formed by a second set of curves. Alternatively, the shape (e.g. the amplitude, wavelength and/or profile) formed by the first set of curves may differ from the shape formed by the second set of curves.

Each concave curve may extend from a local maximum to a local maximum via a local minimum. Each convex curve may extend from a local minimum to a local minimum via a local maximum. Each curve may have an amplitude defined as the axial distances between said local maximum or minimum and the local minima or maxima respectively. In the case that the axial distance between the local maximum/minimum and each of the respective minima/maxima differs, the amplitude shall be taken as the larger of the two axial distances. A local maximum of one curve may be the local minimum of another curve, for example the next curve in the set. A local minimum of one curve may be the local maximum of another curve, for example the next curve in the set. For example, the middle curve may share a minimum or maximum with each of the end curves.

Each curve may be immediately adjacent to another curve in the set of three curves. For example the middle curve may be immediately adjacent to both the end curves. It may be that there is no turning point (e.g. no point at which the derivative of the line changes sign) located in between and end curve and the middle curve of a set.

The amplitude of the end curves (e.g. the first and third curves) may be greater than the amplitude of the middle curve (e.g. the second curve). Such a shape may be advantageous in terms of the roll stiffness and/or stress distribution within the leg.

The amplitude of the curves of a first set of three curves (e.g. the first, second and third curves) may differ from the amplitude of the curves of a second set of three curves (e.g. the fourth, fifth and sixth curves).

Each curve may have a wavelength, defined as the radial distance between the local maxima or the local minima, depending on whether the curve is convex or concave respectively. The wavelength of the end curves (e.g. the first and third curves) may be greater than the wavelength of the middle curve (e.g. the second curve). Such a shape may be advantageous in terms of the roll stiffness and/or stress distribution within the leg.

A leg may have a length (radial extent) very much greater than its width (circumferential extent) and/or thickness (axial extent). The width of a leg may be very much greater than its thickness.

The spider may include a first, for example an outer, edge region (or rim) at which the spider is attached to the chassis. The spider may include a second, for example an inner edge region, at which the spider is attached to the voice coil. Each leg may extend from the first edge region towards the second edge region. Each leg may extend from the second edge region towards the first edge region. Each leg may extend between the first and second edge regions. The spider may be attached to the chassis and/or voice coil using an adhesive. The spider may be attached to the chassis and/or voice coil using a fastener. The spider may be integrally formed with the chassis and/or voice coil. The first and/or second edge region may comprise a ring, for example a ring that extends around a perimeter of the chassis and/or voice coil respectively. Alternatively, the first and/or second edge region may be discontinuous, for example comprising a plurality of edge members each member extending around a portion of the inner perimeter of the chassis and/or the outer perimeter of the voice coil respectively. The first and/or second edge region may comprise a flange via which the spider is joined to the chassis and/or voice coil respectively.

Each leg may include a first attachment portion at which the leg is attached to the rest of the spider, for example the first edge region. Each leg may include a second attachment region at which the leg is attached to the rest of the spider, for example the second edge region. Each leg may be integrally formed with the first and/or second edge regions.

Each leg may be attached to an edge region using an adhesive. Each leg may be attached to an edge region using a fastener.

Each leg may include a first flange via which the leg is joined to the rest of the spider. Each leg may include a second flange via which the leg is joined to the rest of the spider. The flanges may appear as enlarged portions of the spider when viewed in cross-section.

It will be understood that the present invention relates to the shape of the portion of the leg extending between the attachment regions (or flanges). The first, second and third curves (and fourth, fifth and sixth curves if present) may be located in-between the first and second attachment regions. For example, in radial order from outermost to innermost, the spider may comprise a first flange, a first curve, a second curve, a third curve, (and, if present, a fourth curve, a fifth curve, a sixth curve) and a second flange. It will be appreciated that further sets of curves, if present, are located in-between the first and second attachment regions.

The reference plane may be a plane perpendicular to the direction of movement of the voice coil. The reference plane may be a plane parallel to that defined by the perimeter of the voice coil. The reference plane may a plane parallel to the front edge of the voice coil. The reference plane may be coplanar with the midplane of the voice coil.

The cross-sectional shape of each leg may be the same as any other leg of the spider. Providing a spider where all the legs have the same shape may facilitate manufacture of the spider. Additionally or alternatively, providing a spider where all the legs have the same shape may provide improved stability and centring of the voice coil. The legs of the spider may be equidistantly spaced around the perimeter of the voice coil.

The spider may comprise, consist of and/or be made substantially and/or essentially of a plastic material, for example a thermoplastic polymer and/or thermoplastic elastomers (TPE), for example Polyether ether ketone (PEEK). PEEK may provide an improved fatigue performance in comparison to other materials typically used in loudspeaker spiders. The spider may comprise, consist of and/or be made substantially and/or essentially of a metal.

The spider may include three or more legs, for example six or eight legs. The spider may include no more than twenty legs, for example no more than ten legs. The legs may be equidistantly spaced around the perimeter of the voice coil.

It may be that a mass element is mounted on, for example integrally formed with, each leg such that the mass element can move relative to the rest of the spider (i.e. the spider excluding the mass element and the leg on which it is mounted), the mass element and the leg thereby forming a mass damping element configured to damp vibration of the spider. Each mass element may comprise a body having a width and/or thickness very much larger than the adjacent portion of the leg. The spider may comprise one or more mass damping elements configured to damp vibration of the spider. Each mass damping element may comprise a mass element and a resilient portion configured and arranged such that the mass element can move relative to the rest of the spider. The resilient portion may be one of the plurality of legs. Thus, each leg may form (at least in part) the resilient portion of a mass damping element configured to damp vibration of the spider. Use of such mass damping elements in the spider may reduce the transmission of vibration to a loudspeaker enclosure in which the loudspeaker assembly is mounted. A loudspeaker assembly comprising mass damping elements is discussed further below, with reference to the second aspect of the invention and features described with reference to the second aspect of the invention may be used in loudspeaker assemblies in accordance with the present aspect.

It may be that the cross-sectional area of each leg varies with radial distance along the leg. When the diaphragm is in the neutral position it may be that each leg comprises a first region having a first cross-sectional area, a second region having a second cross-sectional area, and a third region having a third cross-sectional area, the second region being located between the first and third regions, the second cross-sectional area being smaller than the first and third cross-sectional areas. Use of legs with varying cross-sectional areas may facilitate an improved stress distribution within the leg, thereby reducing the maximum stress concentration and increasing the fatigue life of the spider. A loudspeaker assembly comprising legs with varying cross-sectional area is discussed further below, with reference to the third aspect of the invention and features described with reference to the third aspect of the invention may be used in loudspeaker assemblies in accordance with the present aspect.

It may be that the spider comprises one or more intermediate members spaced apart radially from the inner edge region and the outer edge region. The spider may comprise a first set of legs, each leg of the first set extending radially from an intermediate member towards the chassis, for example to the outer edge region of the chassis. The spider may comprise a second set of legs, each leg of the second set extending radially from an intermediate member towards the voice coil, for example to the inner edge region of the chassis. Use of such intermediate member(s), for example a ring located partway between the first and second edges of the spider, may provide additional design flexibility and/or allow for improved stress distribution in the spider. A loudspeaker assembly comprising such an arrangement is discussed further below, with reference to the fourth aspect of the invention and features described with reference to the fourth aspect of the invention may be used in loudspeaker assemblies in accordance with the present aspect.

The intermediate member may be in the form of a ring. For example the spider may comprise a single intermediate member in the form of a ring. It may be that each leg of the first set extends radially from the ring towards the chassis and each leg of the second set extends radially from the ring towards the voice coil.

The intermediate member(s) and/or ring may be integrally formed with the rest of the spider, for example with the legs of the first and/or second set.

The diaphragm may be a cone shaped member. The diaphragm may generally be in the form of a planar member. The diaphragm may be a planar member. The diaphragm may be a dome shaped member. The diaphragm may have a constant radius, i.e. be circular. The diaphragm may have a non-constant radius, i.e. be non-circular.

The chassis may be arranged and configured so as to be suitable for supporting a loudspeaker diaphragm and for mounting in a loudspeaker enclosure to form a hi-fi loudspeaker system.

The voice coil may be mounted on the diaphragm, for example on the apex of the diaphragm to move with the diaphragm. The voice coil may comprise a coil of wire or other form of winding configured to provide motive force to the diaphragm, for example when a current flows through the wire in the presence of a magnet field. The voice coil may comprise a former or cylindrical bobbin around which the coil or other winding is wound.

The loudspeaker assembly may comprise a magnet assembly defining a voice coil gap. The loudspeaker assembly may be configured such that a voice coil mounted on the diaphragm extends into the voice coil gap.

The spider may extend around the whole or a part of the perimeter of the voice coil. The voice coil may be arranged and configured relative to the chassis such that a gap is formed between the chassis and the voice coil. The gap may extend around the majority of the perimeter of the voice coil. The gap may extend around the whole of the perimeter of the voice coil. The voice coil may be concentrically located with respect to the chassis. Thus, the width of the gap may be substantially constant around the perimeter of the voice coil. The width of the gap may be defined as the radial distance between the outermost edge of the voice coil and the innermost edge of the chassis. The width of the gap may be less than or equal to 10 mm; less than or equal to 5 mm; or less than or equal to 4 mm. The width of the gap may be greater than or equal to 1 mm.

The diaphragm may be arranged and configured relative to the chassis such that a forward gap is formed between the chassis and the diaphragm. The loudspeaker assembly may comprise a support that extends across the forward gap between the chassis and the diaphragm.

The diaphragm may be arranged and configured to move axially from a neutral position to an extended position. It will be understood that the voice coil mounted on the diaphragm will move with the diaphragm from a neutral position to an extended position. The diaphragm (and/or voice coil) may be arranged and configured to move axially from the extended position to the neutral position. In certain embodiments the diaphragm (and/or voice coil) will move away from the neutral position in both axial directions, for example forwards and backwards. The neutral position may be defined as the position occupied by the diaphragm (and/or voice coil) in the absence of any force generated by the loudspeaker system. Thus, the neutral position may be defined as the position occupied by the diaphragm (and/or voice coil) when not being driven. Forces generated by the loudspeaker system may include electro-motive forces generated as a result of current flowing through the voice coil. Forces generated by the loudspeaker assembly may include pressure waves generated by the diaphragm and propagated within a loudspeaker enclosure. The diaphragm (and/or voice coil) may be located forward or rearward of the neutral position when the diaphragm (and/or voice coil) is in the extended position.

The excursion of the diaphragm (and/or voice coil) may be defined as the distance moved by the diaphragm (and/or voice coil) away from the neutral position. It will be understood that the shape of the spider may change as the diaphragm (and/or voice coil) moves between the neutral and extended positions. It may be that the extended position is the position of maximum excursion occupied by the diaphragm (and/or voice coil) during normal operation. It may be that the extended position is the point of maximum forward travel occupied by the diaphragm (and/or voice coil) during normal operation. It may be that the extended position is the point of maximum rearward travel occupied by the diaphragm (and/or voice coil) during normal operation. The maximum excursion of the diaphragm (and/or voice coil) may be less than or equal to 20 mm; less than or equal to 10 mm; less than or equal to 5 mm. The maximum excursion of the diaphragm may be greater than or equal to 1 mm. The maximum excursion of the diaphragm (and/or voice coil) may be related to the size of the loudspeaker assembly, for example the size of the diaphragm. If the diameter of the diaphragm is 300 mm, it may be that the maximum excursion of the diaphragm is 20 mm. If the diameter of the diaphragm is 19 mm, it may be that the maximum excursion of the diaphragm is 1 mm.

In use, movement of the diaphragm (and/or voice coil) from the neutral position towards the extended position causes the end of the spider proximate to the voice coil to move relative to the end of the spider proximate to the chassis. The spider is typically made from resilient material having a given stiffness. The stiffness of the spider may vary as a function of the movement of one end of the spider relative to the other. The cross-sectional shape of the spider may be such that the stiffness of the spider is substantially constant with respect to displacement of the voice coil in the normal operational range of the assembly. For example, it may be that the stiffness of the spider does not very by more than 10% in relation to a 90% range of movement relative to the maximum excursion.

In certain embodiments the spider may be arranged and configured to support the voice coil (and/or the diaphragm on which it is mounted) relative to the chassis. The spider may connect the periphery of the voice coil to the chassis. The spider may extend along a portion only of the perimeter of the voice coil. The spider may extend along the majority of the perimeter of the voice coil. The spider may extend along the whole of the perimeter of the voice coil. The spider may extend across the gap from the voice coil to the chassis.

The cross-sectional shape of the spider may be defined as the shape of the spider when viewed in cross-section, e.g. about a notional plane that is tangential to the outer edge of the voice coil.

The cross-sectional shape of the spider, and particularly a leg, may be considered as being defined by a line (for example comprising the first, second and third curves) in two-dimensional space. It may be that for any given radial location on the spider the line which defines the cross-sectional shape of the spider passes through a point in the spider equidistant from the front and back surfaces of the spider.

The front face of the diaphragm may be defined as the outermost surface of the diaphragm when the unit is installed in an enclosure. Thus, if the loudspeaker assembly includes a grille, the front face of the diaphragm may be defined as the surface of the diaphragm closest to the grille. Forward and backwards axial movement of the diaphragm may be defined as movement of the diaphragm towards and away from the grille respectively.

The loudspeaker assembly may be suitable for use at frequencies between 200 Hz and 5000 Hz, for example between 1000 Hz and 5000 Hz.

According to a second aspect of the invention, there is provided a loudspeaker assembly comprising one or more of a diaphragm, a voice coil mounted on the diaphragm for movement therewith, a chassis and a spider. It may be that the spider extends across a gap between the chassis and the voice coil and comprises one or more mass damping elements. Each mass damping element may comprise a mass element and a resilient portion configured and arranged such that the mass element can move relative to the rest of the spider. The resilient portion may comprise a leg extending radially across a portion of the gap. Thus, a mass element may be mounted on, for example formed integrally with a leg of the spider to provide a mass damping element. Using the legs of a spider to provide mass damping elements may provide improved sound quality by reducing unwanted vibration in the spider and/or the transmission of vibration to the chassis. Additionally or alternatively, using the legs as the resilient portion of such a mass damping element may facilitate the efficient manufacture of spiders in accordance with the present invention. Loudspeakers in accordance with the present aspect of the invention may have any of the features described in relation to any other aspect of the invention.

A mass damping element may reduce vibration by dissipating energy. Thus, using mass damping elements to damp the vibration of the spider allows the acoustic performance of the spider to be improved. The present invention has thus recognised that damping of the spider, particularly by using such mass damping elements, may improve performance of the loudspeaker assembly. With the use of the present invention it may be possible both to reduce transmission of unwanted vibration to the loudspeaker enclosure and/or diaphragm, thereby providing an overall improvement in performance.

The mass element may be located partway, for example midway, along the leg in the radial sense, for example halfway between the first and second attachment regions. In the case that the leg has first, second and third curves, the mass element may be located along one of the curves, for example the second curve.

It will be understood that the present invention relates leg extending between the attachment regions (or flanges). The mass element may be located in-between the first and second attachment regions. For example, in radial order from outermost to innermost, the spider may comprise a first flange, a first curve, a second curve and a mass element, a third curve, (and, if present, a fourth curve, a fifth curve, a sixth curve) and a second flange.

The mass element may be integrally formed with the leg. Thus, the mass element may be integrally formed with the spider. The mass element and leg may be of a monolithic construction. Thus, the mass element, leg and spider may be of a monolithic construction. The mass element may be formed from a different material to the leg. The mass element may comprise, consist of and/or be made substantially and/or essentially of a plastic material, for example a thermoplastic polymer and/or thermoplastic elastomers (TPE), for example Polyether ether ketone (PEEK). The mass element may comprise, consist of and/or be made substantially and/or essentially of metal.

At least some of the benefits of the invention could be achieved by an embodiment utilising a single mass damping element. It is preferred however that the spider includes a plurality of mass damping elements mounted on, for example attached to, for example directly attached to, and/or integrally formed with, the spider. Using more than one (and preferably four or more) separate mass damping elements may allow more efficient use of the damping properties, and/or more efficient deployment of the material or means that provides such damping properties. The spider may include a plurality of mass elements circumferentially spaced around the perimeter of the voice coil. The mass elements may be symmetrically arranged around the voice coil. The mass elements may be a-symmetrically arranged around the voice coil. Each mass element is conveniently in the form of a discrete element separate and spaced apart from other such mass elements, and preferably distinct from the rest of the spider.

A vibrational (or break-up) mode may be defined as a frequency at which the spider stops moving as a rigid piston, that is with all the points on the spider moving with the same phase. Thus, a vibrational mode may be characterised by a resonant frequency and a mode shape. A complex body such as a spider may have more than one vibrational mode. Thus, the shape of the spider at any particular frequency may be a combination of those vibrational modes. As the frequency at which the spider is vibrated approaches a resonant frequency the spider approaches the mode shape of the corresponding vibrational mode.

Mass damping elements may reduce vibration in the spider by dissipating kinetic energy. A mass damping element may be characterized by the mass of the mass element and the stiffness of the resilient portion (i.e. the leg). Thus, a mass damping element with a given mass and stiffness may improve the acoustic performance generally by dissipating kinetic energy in use. Alternatively or additionally, the mass of the mass element and the stiffness of the resilient portion may be chosen such that the mass damping element damps a specific vibrational mode. Such a mass damping element may be referred to as a tuned mass damping element. Altering the mass of the mass element and/or the stiffness of the resilient portion may thus enable a mass damping element to be tuned to a given frequency, when designing a mass damping-element for a given purpose. A mass damping element may be tuned by incorporating materials which have a high mechanical loss factor at the frequency of a given vibrational mode. For example, the mass damping-element may include materials which have a loss factor of at least 0.5 at a given vibrational mode (at operating temperature). Each mass damping element of the spider may be tuned to a specific vibrational mode. Thus, a vibrational mode of the spider may be damped by the or each tuned mass damping element. A mass damping element tuned to a first mode may also attenuate vibration at a second mode. Some of the mass damping elements may be tuned to a particular vibrational mode and some not.

In the case of a spider including more than one tuned mass damping element, each mass damping element may be tuned to damp the same vibrational mode. All of the tuned mass damping elements may be tuned to have substantially the same frequency-dependent attenuation properties. Thus, a vibrational mode of the spider may be damped by means of the tuned mass damping elements.

Alternatively, in the case of a spider including more than one tuned mass damping element, a first set of mass damping elements may be tuned to a first vibrational mode and a second set of mass damping elements may be tuned to a second vibrational mode. Further sets of tuned mass damping elements may be tuned to further vibrational modes. A set may include one or more tuned mass damping elements. Thus, more than one vibrational mode of the spider may be damped by means of the tuned mass damping elements. Each significant vibrational mode of the spider may be damped by means of the tuned mass damping elements.

Thus, the spider may include one or more tuned mass damping elements such that the one or more vibrational modes of the chassis are damped by said mass damping elements.

Whether or not a mass damping element is deemed as being a tuned mass damping element, in the context of those aspects of the present invention which require such tuned mass damping elements, may (optionally) be judged in the following way. One may remove the mass damping element from the spider and then measure the frequency response of both the mass damping element and of the spider. The spider will have response peaks at one or more frequencies where resonances occur whereas the mass damping element will have one or more frequencies at which the damping properties peak. If a resonant frequency, within the acoustic range of frequencies of relevance, of the spider coincides with (within about 20%, and preferably within about 10% of the frequency) a frequency at which damping provided by the mass damping element peaks, then the mass damping element may be considered as a tuned element. It will be appreciated that a mass damping element may be deemed as a tuned mass damping element by means of alternative criteria. The spider may include primary tuned mass damping elements, tuned to dampen a primary mode of vibration of the spider. The spider may include secondary tuned mass damping elements, tuned to dampen one or more secondary modes of vibration of the spider (with the primary tuned mass damping elements attached). In such a case, the secondary tuned mass damping elements may need to be removed from the spider to assess whether and how the primary tuned mass damping elements are tuned to the frequency response of the spider.

The addition of the mass damping elements preferably reduces the amplitude of the response at a resonant frequency, within the acoustic range of frequencies of relevance, of the spider by a factor of more than 1.4 (and preferably provides more than 3 dB of attenuation).

The mass element may be, or have the general form of, an elongate body for example a cylindrical body. The mass element may be formed, at least in part, from a plastic material, for example a thermoplastic polymer, for example Polyether ether ketone (PEEK).

The resilient portion (for example the leg) preferably has a mechanical loss factor of at least 0.5 at the vibrational mode of interest (at operational temperature).

The loudspeaker assembly, for example the spider, may be suitable for use in a mid-range driver. The spider may be suitable for use in a bass driver. The spider may be suitable for use in a full range driver.

According to a third aspect of the invention, there is provided a loudspeaker assembly comprising one or more of a diaphragm, a voice coil mounted on the diaphragm for movement therewith, a chassis and a spider. It may be that the spider extends across a gap between the voice coil and the diaphragm. The spider may comprise one or more legs extending radially across at least a portion of the gap. The diaphragm may be configured to move from a neutral position to an extended position. It may be that when the diaphragm is in the neutral position the one or more legs comprises a first region having a first cross-sectional area, a second region having a second cross-sectional area, and a third region having a third cross-sectional area, the second region being located between the first and third regions. It may be that the second cross-sectional area is smaller than the first and third cross-sectional areas. Spiders in accordance with the present aspect may have any of the features described with any other aspect of the invention.

Varying the cross-sectional area of the leg with radial distance may allow for stress in the part to be more evenly distributed thereby reducing the maximum stress concentration in the leg and thereby increasing the fatigue life of the spider.

It will be appreciated that the radial position of the first and third regions are on either side of the radial position of the second region.

It will be understood that the present invention relates to the shape of the portion of the leg extending between the attachment regions (or flanges). The first, second and third regions may be located in-between the first and second attachment regions. For example, in radial order from outermost to innermost, the spider may comprise a first flange, a first region, a second region, a third region, and a second flange. In the case that the leg has first, second and third curves, the second region may be located along one of the curves, for example the second curve. The first, second and third regions may be located along the first, second and third curves respectively. The first, second and third curves may be located in the first, second and third regions respectively.

The first, second and third regions may be immediately adjacent. For example, the cross-sectional area of the leg may decrease with radial distance to a minimum, before increasing thereafter. The transition between each of the first, second and/or third regions may be smooth or discontinuous.

Alternatively, there may be one or more intermediate regions located between the first, second and/or third regions.

The second region may be located partway, for example midway, along the leg in the radial sense, for example halfway between the first and second attachment regions.

The second cross-sectional area may be at least 20 percent, for example at least 40 percent, for example at least 50 percent smaller than the first and third cross-sectional areas.

It may be that the thickness of each leg is constant with respect to radial distance along the length, for example between the first and second attachment areas. Thus, each leg may comprise a first region having a first width, a third region having a third width, a second region having a second width and being located between the first and second regions and the second width is less than the first and third widths.

The second width may be at least 20 percent, for example at least 40 percent, for example at least 50 percent smaller than the first and third widths.

Each leg may comprise fourth, fifth and sixth regions having fourth, fifth and sixth cross-sectional areas (or widths) respectively, the fifth region being located between the fourth and sixth regions. The fifth cross-sectional area (or width) may be less than the fourth and sixth cross-sectional areas (or width).

According to a fourth aspect of the invention there is provided a loudspeaker assembly comprising one or more of a diaphragm, a voice coil mounted on the diaphragm to move with the diaphragm, a chassis, and a spider. The spider may have an outer edge (or edge region), for example adjacent the chassis. The spider may have an inner edge (or edge region), for example adjacent the voice coil. The spider may comprise one or more intermediate members spaced apart radially from the inner edge (and/or edge region) and the outer edge (and/or edge region). The spider may comprise a first set of legs, each leg of the first set extending radially from an intermediate member towards the chassis. The spider may comprise a second set of legs, each leg of the second set extending radially from an intermediate member towards the voice coil. Loudspeakers in accordance with the present aspect of the invention may have any of the features described in relation to any other aspect of the invention.

Providing such an internal member(s), for example a ring located between the inner and outer edges of the support may provide additional design flexibility and/or facilitate the improved distribution of stress in the spider thereby reducing the maximum stress concentration and increasing the fatigue life of the spider. Additionally or alternatively, the 'two-stage' type spider may allow for a bigger displacement of the diaphragm for a spider of a given height and/or an improved stiffness vs. excursion curve for the spider.

Each internal member may extend around at least a portion of the perimeter of the voice coil, for example the spider may comprise one or more internal members arranged to provide a ring (or part(s) thereof). Thus, the spider may comprise a ring (or a plurality of internal members arranged to form a ring, for example a ring having one or more gaps in its circumference), located between and spaced apart from the first and second edge regions of the spider. The internal members (or ring) may be located partway between the first and second edge regions, for example midway between the first and second edge regions.

Some, for example all, of the legs of the first set may extend from the same internal member. Some, for example all, of the legs of the first set may extend for different internal members. Each leg of the first set may extend from a different internal member. Some, for example all, of the legs of the second set may extend from the same internal member. Some, for example all, of the legs of the second set may extend for different internal members. Each leg of the second set may extend from a different internal member. Legs of the first and second sets may extend from the same internal member.

It may be that the spider comprises a first set of legs extending over a first portion of the gap between the voice coil and the diaphragm and a second set of legs extending over a second portion of the gap between the voice coil and the diaphragm. The first portion of the gap may be radially offset from the second portion of the gap. For example the first portion of the gap may be spaced apart (in a radial sense) from the first portion of the gap such that the legs of the first and second sets do not overlap. Alternatively, the first portion of the gap may be spaced apart (in a radial sense) from the first portion of the gap such that the legs of the first and second sets overlap by less than 50 percent, for example less than 20 percent, for example less than 10 percent.

The legs of the first set may have the same shape as the legs of the second set. The legs of the first set may have a different shape to the legs of the second set. The number, circumferential location and/or shape of the legs may differ as between the first and second set. For example, the number of legs that extend from the first edge region to the internal member(s) may differ from the number of legs that extend from the internal member(s) to the second edge region. The length of the legs of the first set may differ from, for example be greater or less than, the length of the legs of the second set. Each leg of the first and/or second set may include first, second and third and/or fourth fifth and sixth, curves as described above.

One or more mass elements may be mounted on the legs of the first and/or second set.

In a fifth aspect of the invention, there is provide a loudspeaker enclosure having a loudspeaker assembly in accordance with any previous aspect mounted therein.

In a sixth aspect of the invention, there is provided a spider suitable for use as the spider of any other aspect.

In an seventh aspect of the invention, there is provided a method of manufacturing a spider for a loudspeaker, wherein the spider comprises one or more radially extending legs. The method may comprise a step of shaping one or more legs of the spider to follow a line which varies in height above a neutral plane, said line comprising both convex and concave curves, one of a convex or concave curve being in between two of the other of a convex or concave curve to produce a spider having a target stiffness versus excursion response. Thus, the spider may comprise first, second and third curves as described above. The method may further comprise shaping a leg to include fourth, fifth and sixth curves, and/or further curves as described above.

The original spider design may have a leg shape. The method may include changing the design of the leg. The method may include changing the shape of the leg by altering the curvature of the leg to provide first, second and/or third curves. The method may include changing the shape of the leg by increasing or decreasing the amplitude of one or more of the curves, for example the first, second and/or third curves. The method may include changing the shape of the leg by increasing or decreasing the wavelength of one or more of the curves, for example the first, second and/or third curves. Thus, the method may include modifying the amplitude and/or wavelength of said convex and/or concave curves from an original spider design to produce the target stiffness versus excursion response. Modifying the design may alter the stiffness version excursion response of the spider so that a spider made to the modified design has a different stiffness version excursion response from the original design.

The method may include changing the shape of the leg by increasing or decreasing the cross-sectional area of the leg, for example be increasing or decreasing the cross-sectional area (or width in the case of a leg of constant thickness) in a first, second and/or third region.

The method may include adding a mass element to at least one of said legs, to provide one or more mass damping elements to attenuate the frequency response of the spider at and/or around one or more vibrational modes.

The method may also include making the spider according to the modified design. Making the spider may include molding, thermoforming, stamping and/or additive manufacture (also known as 3D printing) of the spider. The method may include integrally forming the chassis and/or spider. The method may include making the spider using a plastic material.

According to an eighth aspect of the invention there is provided a method of manufacturing a spider, wherein the method includes the following steps: providing a spider comprising a plurality of radially extending legs and having only at least one vibrational mode and adding to the legs one or more mass elements to provide one or more mass damping elements to attenuate the frequency response at and/or around said at least one vibrational mode.

The method may also include the step of designing a spider structure having at least one mode. The step of designing a spider structure may include providing an original spider structure having at least one mode. The step may further include modifying the design of an original spider by adding a mass element to one or more of the radially extending legs to produce a spider with a reduced frequency response at and/or around said mode.

In a ninth aspect of the invention there is provided a method of manufacturing a spider for a loudspeaker, wherein the spider comprises one or more radially extending legs, and the method comprises a step of shaping one or more legs of the spider such that each leg comprises a first region having a first cross-sectional area, a second region having a second cross-sectional area, and a third region having a third cross-sectional area, the second region being located between the first and third regions, the second cross-sectional area being smaller than the first and third cross-sectional areas to provide a spider having a threshold fatigue life (e.g. a number of cycles of a given type and/or combination of types to failure).

The original spider design may have at least one leg. The method may include changing the design of the leg shape to improve the fatigue life, for example to increase the number of cycles to failure. The method may include changing the shape of the leg to reduce the maximum stress concentration in the leg during a given cycle. The method may include changing the shape of the leg by increasing or decreasing the amplitude of one or more of the curves, for example the first, second and/or third curves. The method may include changing the shape of the leg by increasing or decreasing the wavelength of one or more of the curves, for example the first, second and/or third curves. The method may include changing the shape of the leg by increasing or decreasing the cross-sectional area of the leg, for example by increasing or decreasing the first, second and/or third cross-sectional areas. The method may include increasing or decreasing the width of the leg, for example by increasing or decreasing the first, second and/or third widths.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
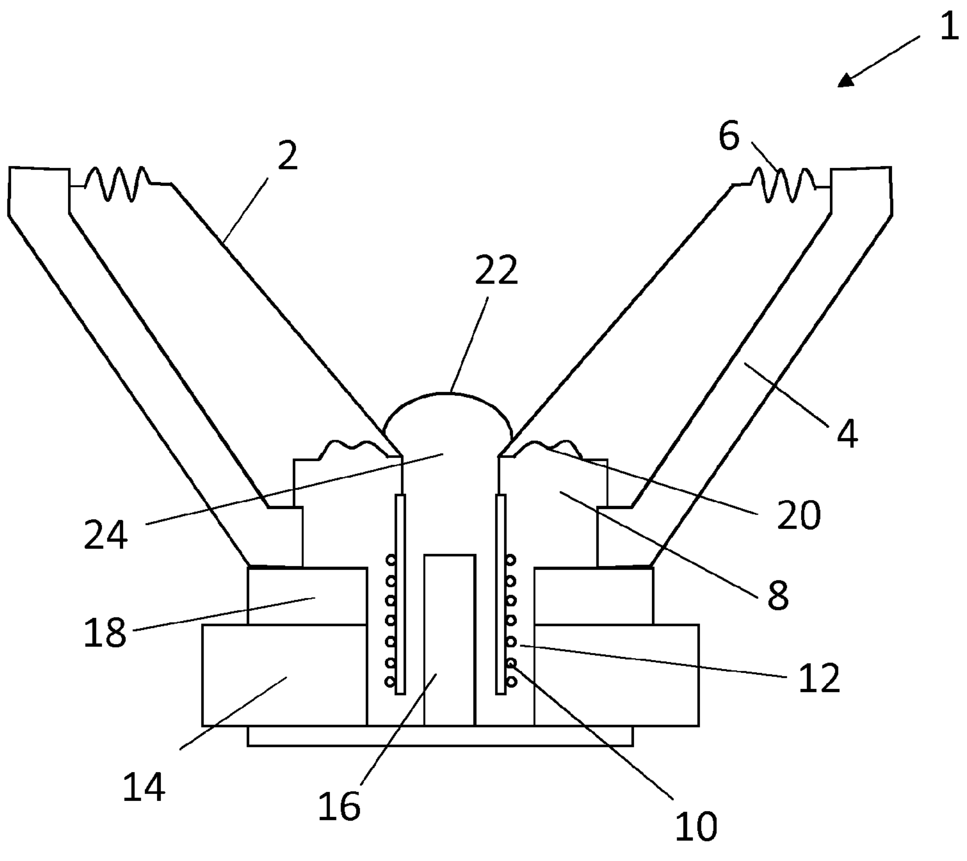
FIG. 1 is a schematic cross-sectional view of a loudspeaker in accordance with a first example embodiment of the invention.

FIG. 1 shows a cross-sectional schematic view of a loudspeaker 1 in accordance with a first embodiment of the invention. A cone-type loudspeaker diaphragm 2, is concentrically located within a chassis 4. An annular surround 6 extends from the outer perimeter of the diaphragm 2 to the inner edge of the chassis 4. A support 6 extends across a gap 8 between the diaphragm 2 and the chassis 4 at the front end of the diaphragm 2. A voice coil 10 is mounted to the rear end of the diaphragm 2 and extends rearwardly from the diaphragm 2 into a voice coil gap 12 formed between an annular magnet 14 and a central pole piece 16. An annular top plate 18 is located between the annular magnet 14 and the chassis 4. A spider 20 is attached to, and extends between, the voice coil 10 and the chassis 4. A dust cap 22 covers a gap 24 in the centre of the diaphragm 2. It will be appreciated that the present invention is concerned with the spider 20, and the shape and configuration of other elements of the loudspeaker, e.g. the shape and configuration of the diaphragm 2, support 6, chassis 4, magnet 14 and/or pole piece 16, may differ from that shown here. Additionally or alternatively, some elements shown here, for example dust cap 22 and/or top plate 18 etc. may be absent in other embodiments of the present invention.

Figure 2:
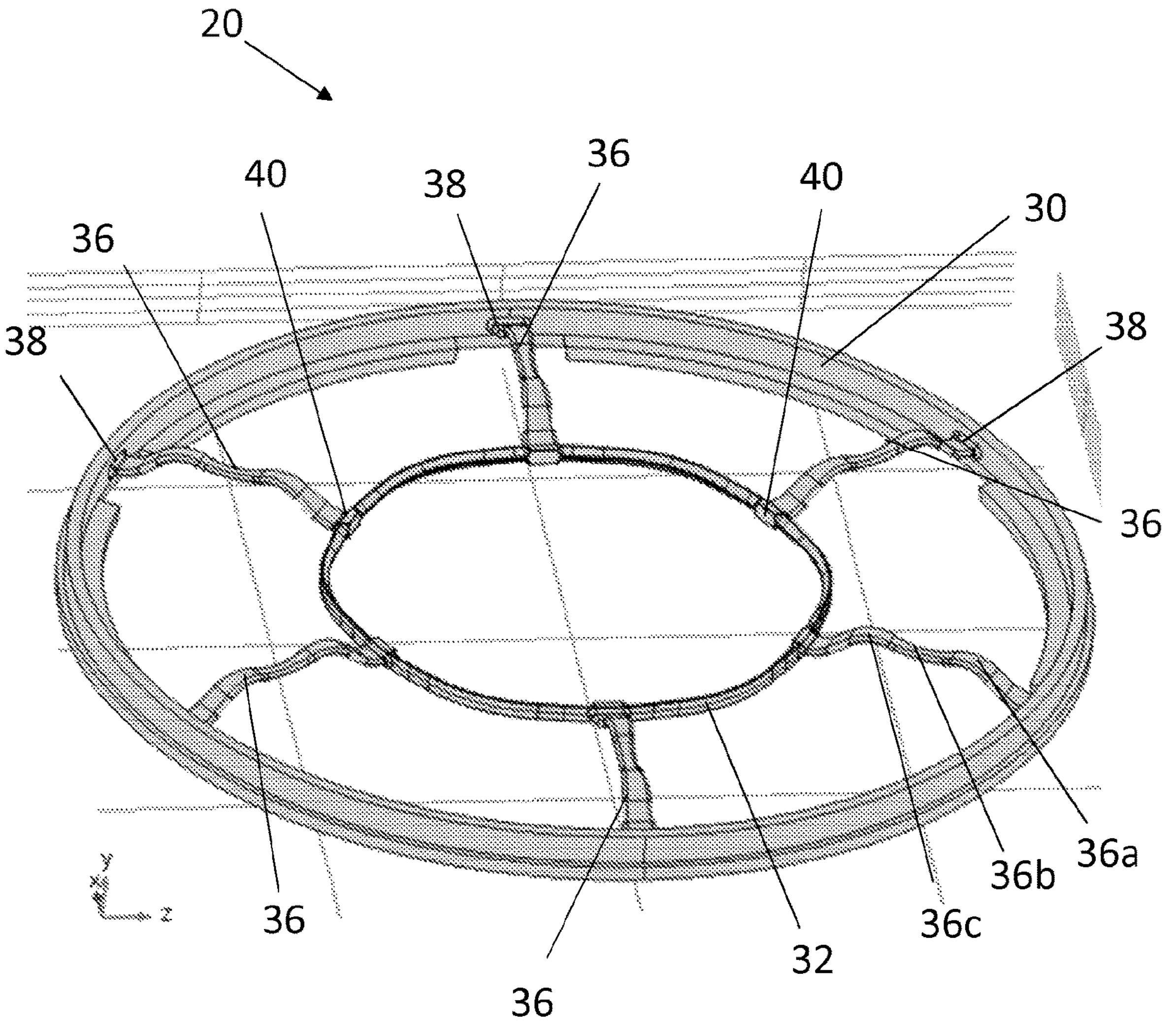
FIG. 2 is a perspective view of the spider of the first embodiment.

FIG. 2 shows a perspective view of the spider 20 of the first example embodiment. The spider 20 comprises an outer ring 30 and an inner ring 32 (while referred to as a ring, it can be seen that ring 32 is closer to a polygon shape) and is made of Polyether ether ketone (PEEK). In other embodiments, the inner and/or outer ring may be only a partial ring. In other embodiments, different materials may be used. Six legs 36 are spaced equidistantly around the outer ring 30 and extend radially between the outer ring 30 and inner ring 32. In other embodiments more or fewer legs may be used, in some cases three legs may be sufficient. Each leg 36 has a length (in the radial direction) and a width (in the circumferential direction) very much greater than its thickness (in the vertical direction). Each leg 36 has a profile that varies with radial distance when viewed in cross-section. Each leg 36 comprises an outer attachment portion 38 and an inner attachment portion 40 via which the leg 36 is connected to the outer ring 30 and inner ring 32 respectively, both attachment portions 38, 40 having a different profile to the portion of the leg 36 immediately adjacent. Each leg 36 of the first embodiment is an 'm'-shaped leg having a profile comprising two curves that curve in a first sense (that sense being convex with respect to the top side of the leg 36) with a curve that curves in a second, opposite, sense (that sense being concave with respect to the top side of the leg 36) located between them. The width of each leg 36 also varies with respect to radial distance along the leg, with a middle region of the leg 36*b*, being narrower than the regions 36*a*, 36*c* on either side. The middle region of the leg 36*b* is the concave region of the leg. In use, outer ring 30 is connected to the chassis 4 and inner ring 32 is connected to the voice coil 10.

Figure 3:
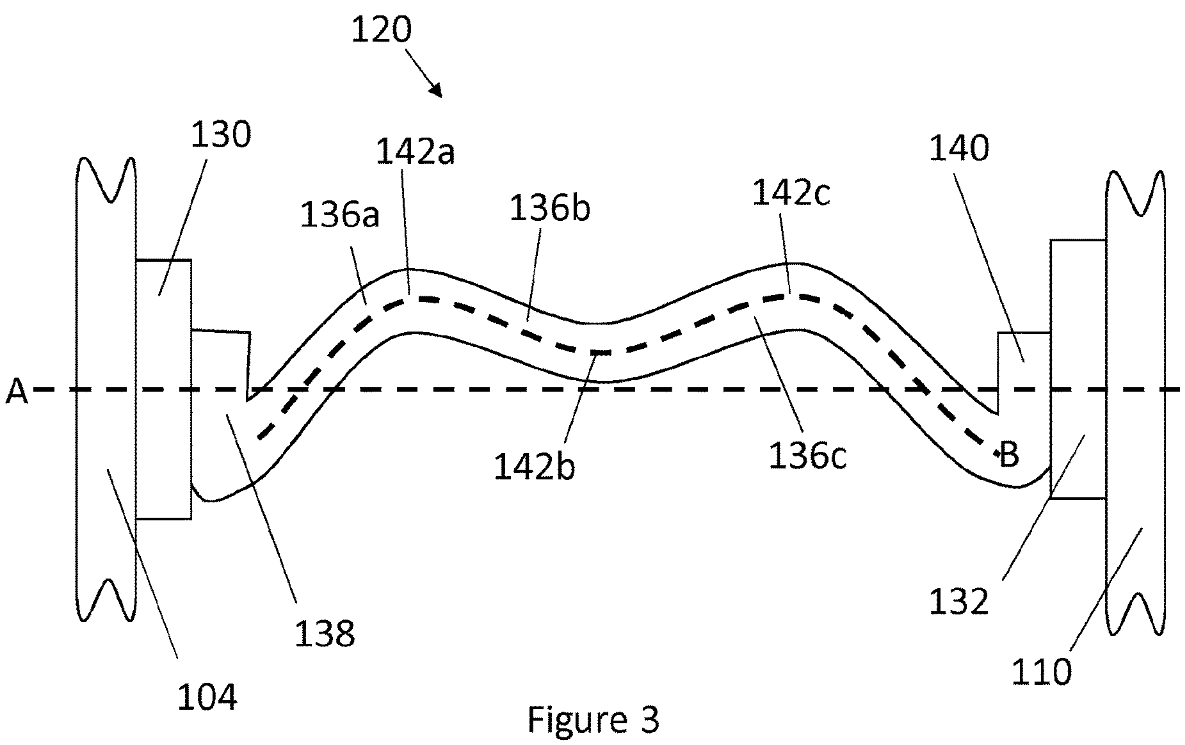
FIG. 3 is a schematic view of a portion of a spider in accordance with a second example embodiment of the invention.

FIG. 3 shows a portion of a spider 120 having an m-shaped leg, similar to the type shown in FIG. 2, in accordance with an embodiment of the invention. Elements that are similar as between FIG. 1 or 2 and FIG. 3 have been indicated in FIG. 3 using their reference numeral from FIG. 1 or 2 incremented by 100 (i.e. spider 20 in FIG. 1 or 2 is referred to as spider 120 in FIG. 3). Working from left to right, FIG. 3 shows a portion of the chassis 104 to which an outer ring 130 of the spider 120 is attached. An outer flange 138 connects the outer end of a leg 136 to the outer ring 130 and an inner flange 140 connects the inner end of the leg 136 to the inner ring 132 of the spider 120. The inner ring 132 is connected to a portion of the voice coil 110. A dashed line labelled A extends horizontally across FIG. 3 and denotes a neutral plane i.e. a plane perpendicular to the voice coil 110. A dashed line labelled B in FIG. 3 denotes the midline of the leg 136 (i.e. a series of points equidistant between the upper and lower surfaces of the leg). The height of the midline B varies with respect to the neutral plane A with radial distance between outer flange 138 and inner flange 140. In a first region 136*a* of the leg 136, the height increases to a maximum at a point 142*a* and then begins to decrease. In a second region 136*b* of the leg 136, the height decreases to a minimum at a point 142*b* and then begins to increase. In a third region 136*c* of the leg 136, the height increases to a maximum at a point 142*c* and then begins to decrease. The second region 136*b* is located between the first and third regions 136_a_, 136_c_ and the shape of the leg 136 is smooth as it transitions between each region. Such a leg may be said to have two concave regions and a convex region when considered from above. The depth of the convex region (i.e. second region 136_b_) is less than the height of the concave regions (i.e. first and third regions 136_a_, 136_c_).

In FIG. 3, the height varies while the midline B remains above the neutral plane, in other embodiments, the height may vary while the midline B remains below the neutral plane. In yet further embodiments, the height may vary while the midline B crosses the neutral plane. In FIG. 3 the leg 36 may be described has having an 'm' shape. In other embodiments the shape of the leg may comprise two convex regions with a concave region between them (when considered from above). Such a leg may be referred to as having a 'w' shape.

The shape of the 'w' or 'm' or the combination thereof may be varied to provide a spider with a target stiffness vs excursion curve. Spiders with legs having such an 'm' or 'w' profile may provide better radial stiffness than a spider of the same material with legs having a simple roll profile. This in turn may allow a more flexible material to be used for the spider, while maintaining the ability of the spider to control and stabilise the voice coil. Such spiders may also be more compact that spiders with legs having a simple roll profile and providing the same range of movement of the diaphragm. The shape of the legs may also result in an improved stress distribution in the leg thereby increasing the fatigue life of the spider.

Figure 4:
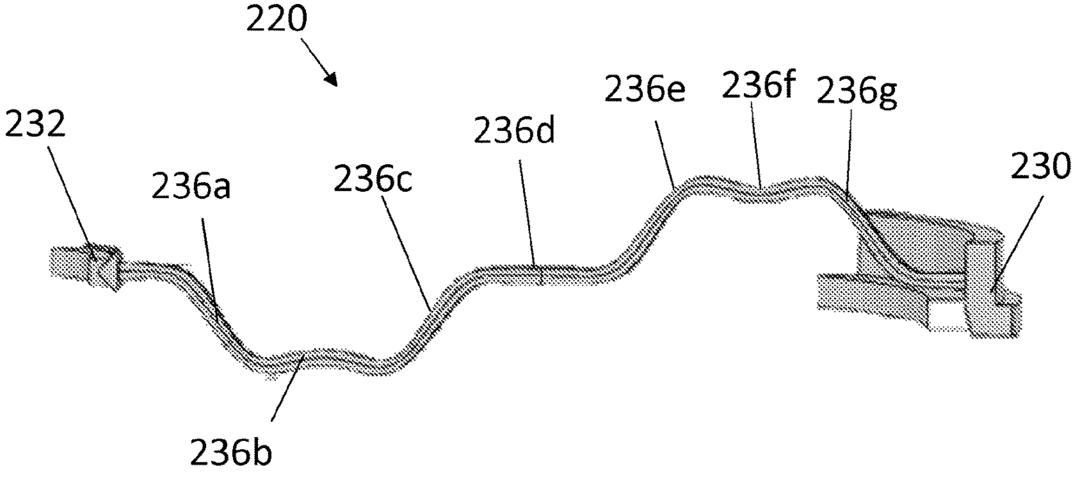
FIG. 4 shows a schematic view of a portion of a spider in accordance with a third example embodiment of the invention.

FIG. 4 shows a portion of a spider 220 in accordance with an embodiment of the invention. Elements that are similar as between FIG. 1 or 2 and FIG. 4 have been indicated in FIG. 4 using their reference numeral from FIG. 1 or 2 incremented by 200 (i.e. spider 20 in FIG. 1 or 2 is referred to as spider 220 in FIG. 5). FIG. 4 shows a leg in which the first, second and third regions 236_a_, 236_b_, 236_c_ comprise concave, convex and concave curves respectively (i.e. a 'w' shape) and the leg 236 further comprises, when viewed from left to right, a fourth transition region 236_d_, and fifth, sixth and seventh regions 236_e_, 236_f_, 236_g_. The fifth, sixth and seventh regions 236_e_, 236_f_, 236_g_ comprise convex, concave and convex curves respectively (i.e. a 'm' shape). The fourth transition region 236_d_ comprises a substantially flat portion of the leg 236 that links the 'w' formed by the first, second and third regions 236_a_, 236_b_, 236_c_ to the 'm' formed by the fifth, sixth and seventh regions 236_e_, 236_f_, 236_g_.

Figure 5:
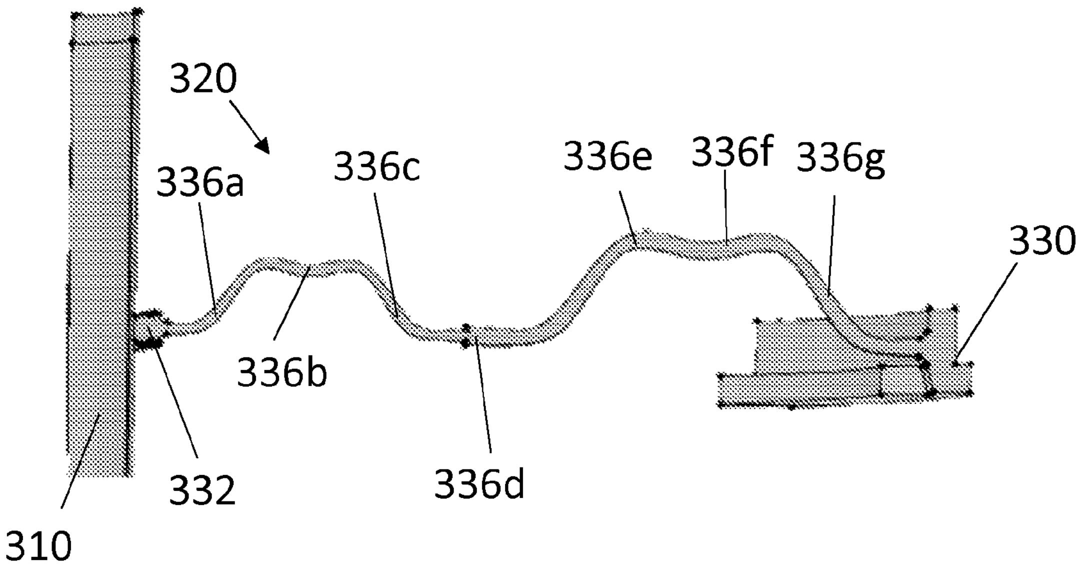
FIG. 5 shows a schematic view of a portion of a spider in accordance with a fourth example embodiment of the invention.

FIG. 5 shows a portion of a spider 320 in accordance with an embodiment of the invention. Elements that are similar as between FIG. 4 and FIG. 5 have been indicated in FIG. 5 using their reference numeral from FIG. 4 incremented by 100 (i.e. first region 236_a_ in FIG. 4 is referred to as first region 336_a_ in FIG. 5). The embodiment of FIG. 5 is similar to the embodiment of FIG. 4 with the exception that the first, second and third regions 336_a_, 336_b_, 336_c_ comprise convex, concave and convex curves respectively (i.e. a 'm' shape). Thus, the leg 336 of the spider 320 comprises two 'm' shapes linked by a substantially flat transition portion 336_d_. The 'm' shape formed by the first, second and third regions 336_a_, 336_b_, 336_c_ is smaller (having both a lower amplitude and shorter wavelength) than the 'm' shape formed by the fifth, sixth and seventh regions 336_e_, 336_f_, 336_g_.

Figure 6:
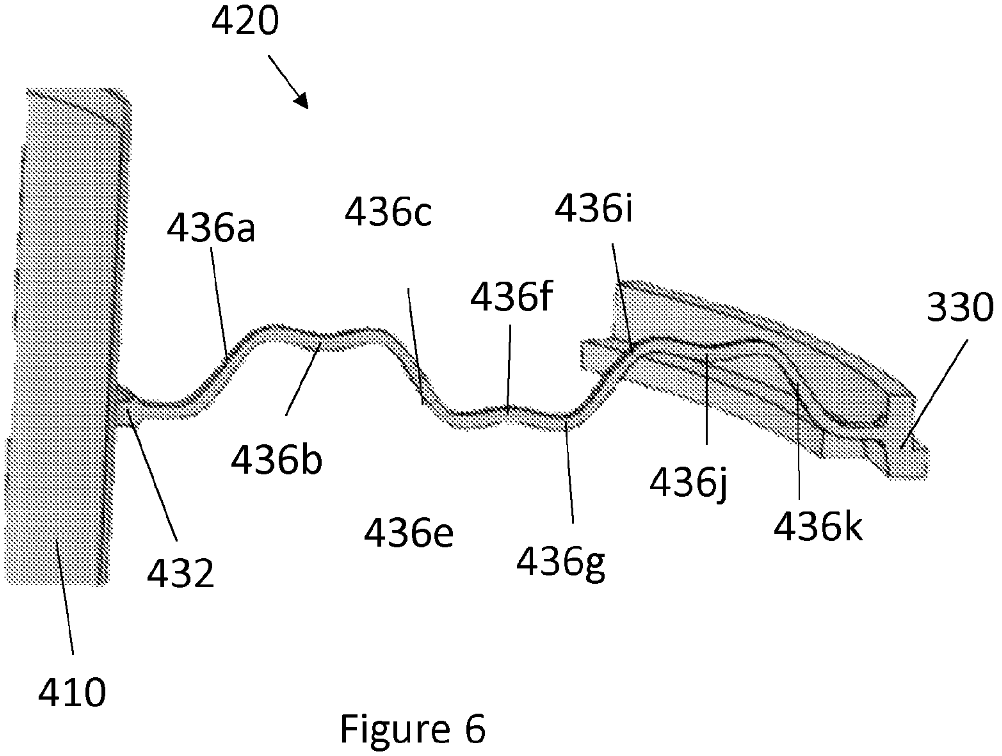
FIG. 6 shows a schematic view of a portion of a spider in accordance with a fifth example embodiment of the invention.

FIG. 6 shows a portion of a spider 420 in accordance with an embodiment of the invention. Elements that are similar as between FIG. 4 and FIG. 6 have been indicated in FIG. 6 using their reference numeral from FIG. 4 incremented by 200 (i.e. first region 236_a_ in FIG. 4 is referred to as first region 436_a_ in FIG. 6). In the embodiment of FIG. 6, the first, second and third regions 436_a_, 436_b_, 436_c_ comprise convex, concave and convex curves respectively (i.e. a 'm' shape), fifth, sixth and seventh regions 436_e_, 436_f_, 436_g_ comprise concave, convex and concave curves respectively (i.e. a 'w' shape) and ninth, tenth and eleventh regions 436_i_, 436_j_, 436_k_ comprise convex, concave and convex curves respectively (i.e. a 'm' shape). No substantially flat transition regions are present in this embodiment; the central 'w' shape is smoothly connected to the 'm' shape on either side.

Figure 7:
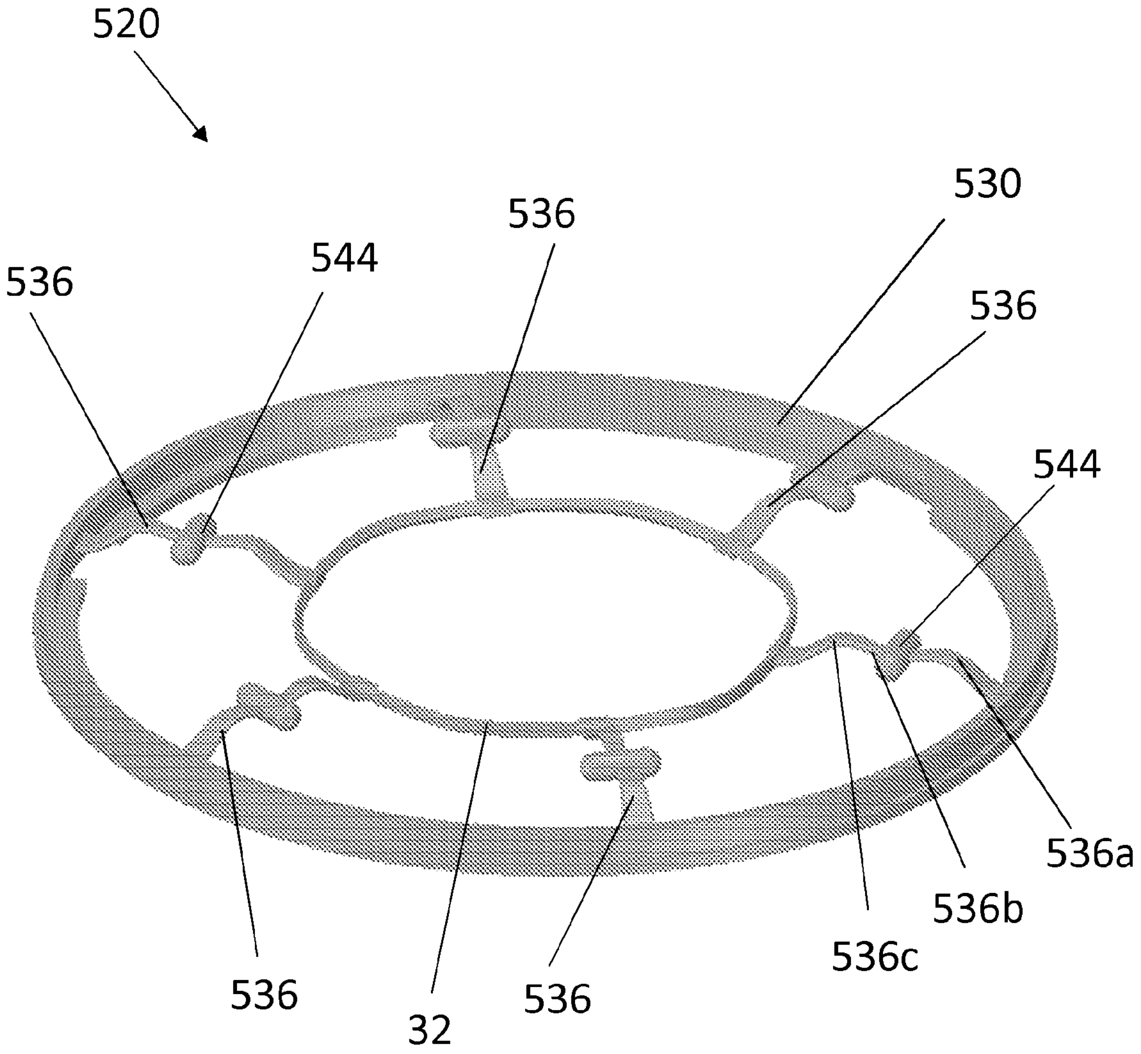
FIG. 7 shows a schematic view of a spider in accordance with a sixth example embodiment of the invention.

FIG. 7 shows an embodiment of the invention in which mass damping elements 544 are provided on the legs 536 of a spider 520 which is otherwise as shown in FIG. 2. Elements that are similar as between FIG. 2 and FIG. 7 have been indicated in FIG. 7 using their reference numeral from FIG. 2 incremented by 500 (i.e. spider 20 in FIG. 2 is referred to as spider 520 in FIG. 7). Each mass damping element 544 comprises a substantially cylindrical body located in the second region 536_b_ of the leg, approximately equidistant between the outer ring 530 and inner ring 532. In other embodiments the shape and/or location of the mass damping element may differ. Each mass damping element 544 is integrally formed with a leg 536. In other embodiments, the mass damping element may be a separate element attached to the leg.

Figure 8:
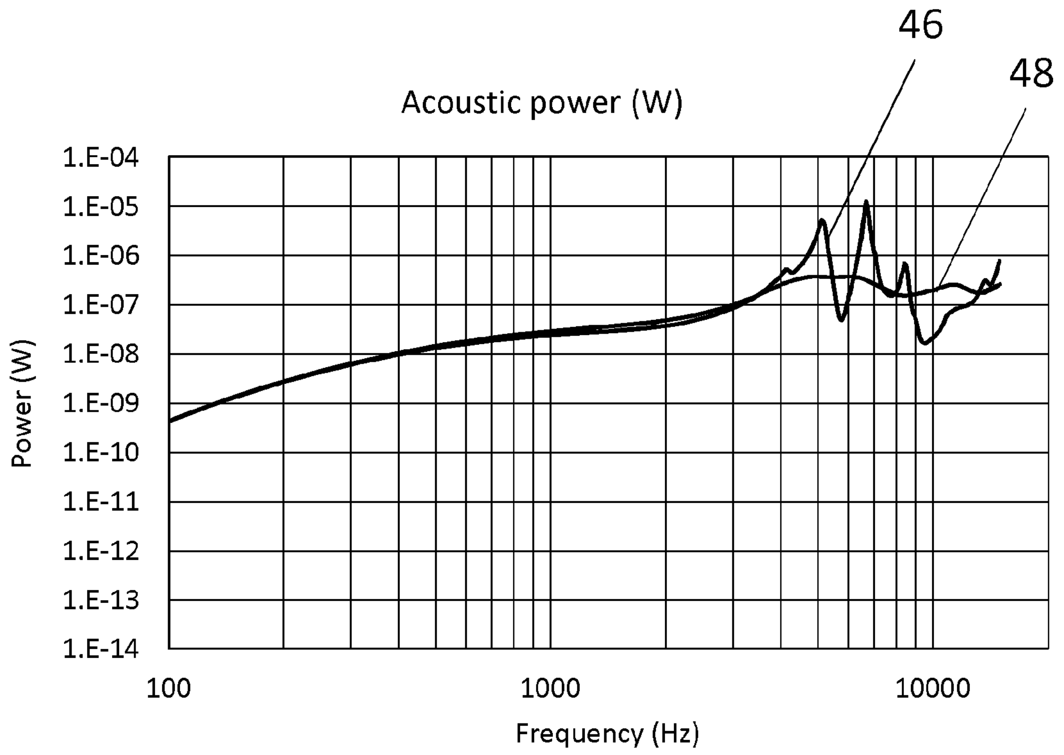
FIG. 8 shows a comparison of acoustic power vs frequency for the spiders of the second and sixth example embodiments.

FIG. 8 shows a plot of acoustic power in Watts (W) vs frequency in Hertz (Hz) using a 3D finite element analysis model to estimate the total radiate acoustic power from the spider alone. Line 46 shows the response of the spider 20 of FIG. 2 (i.e. with no mass damping elements) while line 48 shows the response of the spider 520 of FIG. 7. It can be seen that the response of both spiders is similar below 1000 Hz, but the response diverges above 1000 Hz, particularly with the response of the spider 20 (i.e. line 46) becoming highly variable and the response of the spider 520 (i.e. line 48) being much smoother.

Figure 9:
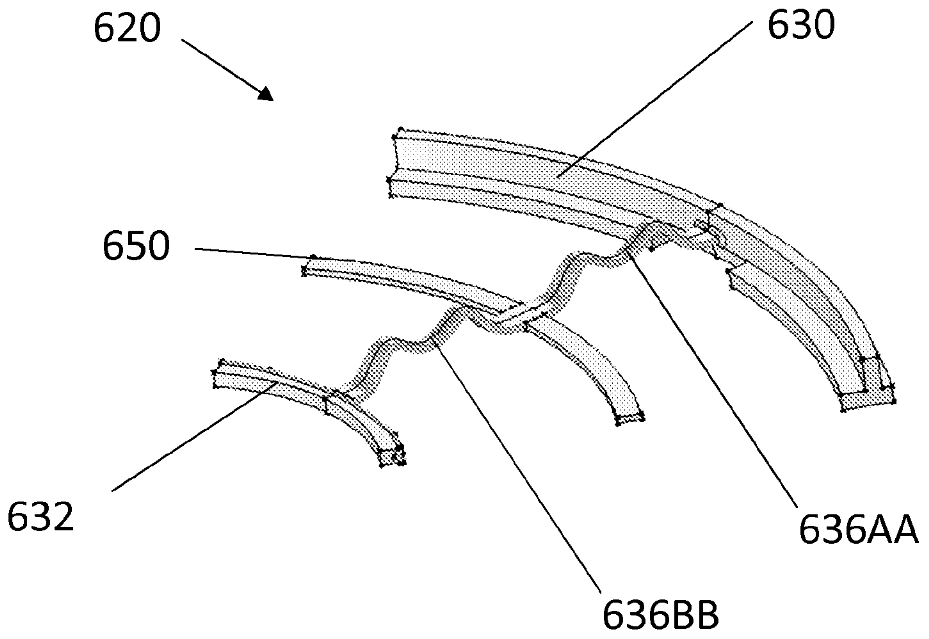
FIG. 9 shows a schematic view of a portion of a spider in accordance with a seventh example embodiment of the invention.

FIG. 9 shows a portion of a spider in accordance with shows a portion of a spider 620 in accordance with an embodiment of the invention. Elements that are similar as between FIG. 2 and FIG. 9 have been indicated in FIG. 9 using their reference numeral from FIG. 2 incremented by 600 (i.e. spider 20 in FIG. 2 is referred to as spider 620 in FIG. 9). In contrast to the FIG. 2 embodiment, an intermediate ring 650 is located between the inner ring 632 and outer ring 630 of the spider 620. A first set of legs 636AA extend between the outer 630 and intermediate 650 rings and a second set of legs 636BB extend between the intermediate 650 and inner ring 632. The number, location and shape of the legs may differ as between the first and second sets. Such spiders may allow for a bigger displacement of the diaphragm for a spider of a given height and/or provide additional design flexibility that assists in achieving a target stiffness/excursion curve. In some embodiments, the intermediate ring 650 may be incomplete, that is to say it may extend around the perimeter of the inner ring 632 at only discrete regions. In other embodiments the intermediate ring may be a complete annulus.

Figure 10:
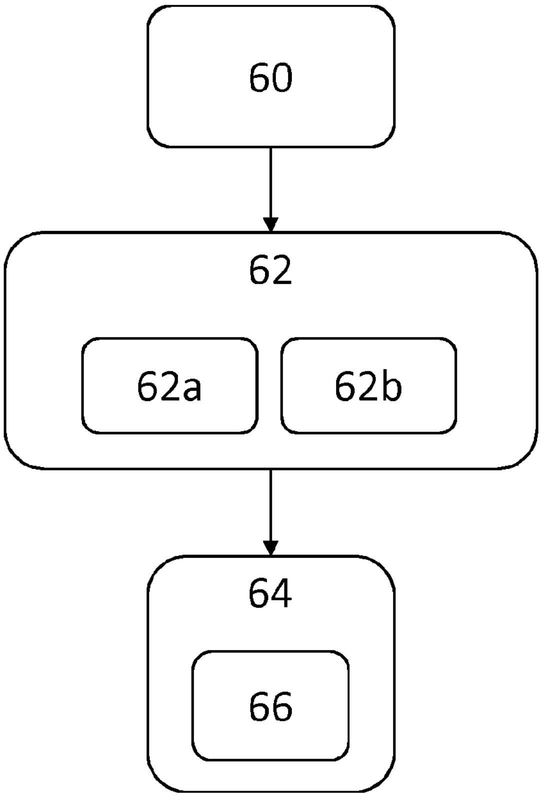
FIG. 10 shows a flow chart of an example method of manufacturing a spider.

FIG. 10 shows a flow chart of an example method of manufacturing a spider in accordance with the present invention. The method comprises a set of providing 60 an original spider design for a spider having a plurality of radially extending legs. The method comprises modifying 62 the design. The step of modifying the design comprises one changing 62_a_ the shape of one or more of the legs to modify the stiffness vs excursion response of the spider and/or adding 62_b_ a mass element to one or more of the legs to attenuate the frequency response of the spider at and/or around one or more vibrational modes. The step of changing

62*a* the shape of the legs comprises one or more of changing the curvature of the leg to provide first, second and/or third curves as discussed above; changing the amplitude and/or wavelength of the first, second and/or third curves; increasing and/or decreasing the cross-sectional area of the leg in a first, second and/or third region; increasing and/or decreasing the width of the leg in a first, second and/or third region.

The method comprises making 64 to the modified design. The step of making 64 the spider comprises molding 66 a spider from plastic material, for example PEEK.

In some embodiments the spider so produced includes one or more legs of the spider to have a cross-sectional shape that includes either (i) a concave curve located between two convex curves or (ii) a convex curve located between two concave curves. In some embodiments the legs include further curves, for example fourth, fifth and sixth curves, as described above.

In some embodiments the spider so produces includes legs having a first region having a first cross-sectional area, a second region having a second cross-sectional area, and a third region having a third cross-sectional area, the second region being located between the first and third regions, the second cross-sectional area being smaller than the first and third cross-sectional areas. In some embodiments, the one or more legs have a constant thickness, and a second width being less a first and a third width, as described above.

In some embodiments the spider so produced includes a mass element mounted on at least one of said legs, the leg and the mass element together forming a mass damping element to attenuate the frequency response of the spider at and/or around one or more vibrational modes.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

What is claimed is:

1. A loudspeaker assembly comprising a diaphragm, a voice coil mounted on the diaphragm to move with the diaphragm, a chassis, and a spider, wherein the spider extends across a gap between the chassis and the voice coil and comprises a plurality of legs, each leg extending radially across at least a portion of the gap;

the diaphragm is configured to move from a neutral position to an extended position and wherein when the diaphragm is in the neutral position the cross-sectional shape of each leg follows a line which varies in height with respect to a reference plane, the reference plane being a plane perpendicular to the direction of movement of the voice coil, said line comprising first, second and third curves, the second curve being located in between the first and third curves and the amplitude of the first and third curves is greater than the amplitude of the second curve and wherein either the first and third curves are convex and the second curve is concave, or the first and third curves are concave and the second curve is convex;

and each concave curve extends from a local maximum to a local maximum via a local minimum and the amplitude of the curve is defined as the axial distance between said local minimum and the local maxima, and each convex curve extends from a local minimum to a local minimum via a local maximum and the amplitude of the curve is defined as the axial distance between said local maximum and the local minima, and in the case that the axial distance between the local maximum/minimum and each of the respective minima/maxima differs, the amplitude shall be taken as the larger of the two axial distances.

2. A loudspeaker assembly according to claim 1, wherein the line further comprises fourth, fifth and sixth curves, the fifth curve being located in between the fourth and sixth curves and wherein either the fourth and sixth curves are convex and the fifth curve is concave, or the fourth and sixth curves are concave and the fifth curve is convex.

3. A loudspeaker assembly according to claim 1, wherein a mass element is mounted on each leg such that the mass element can move relative to the rest of the spider, the mass element and the leg thereby forming a mass damping element configured to damp vibration of the spider.

4. A loudspeaker assembly according to claim 3, wherein the mass element is integrally formed with the leg.

5. A loudspeaker assembly according to claim 1, wherein the spider is made substantially of a plastic material, for example a thermoplastic polymer, for example Polyether ether ketone (PEEK).

6. A loudspeaker assembly according to claim 1, wherein each leg of the spider has the same cross-sectional shape when the diaphragm is in the neutral position.

7. A loudspeaker assembly according to claim 1, wherein the spider is integrally formed with the chassis.

8. A loudspeaker assembly according to claim 1, wherein the spider has an outer edge adjacent the chassis and an inner edge adjacent the voice coil, and comprises one or more intermediate members spaced apart radially from the inner edge and the outer edge;

a first set of legs, each leg of the first set extending radially from an intermediate member towards the chassis; and a second set of legs, each leg of the second set extending radially from an intermediate member towards the voice coil.

9. A loudspeaker assembly according to claim 8, wherein the spider comprises a ring spaced apart radially from the inner edge and the outer edge, each leg of the first set extending radially from the ring towards the chassis, each leg of the second set extending radially from the ring towards the voice coil.

10. A loudspeaker assembly according to claim 9, wherein the ring is integrally formed with the rest of the spider.

11. A loudspeaker assembly according to claim 1, wherein the spider extends around the entire perimeter of the voice coil.

12. A loudspeaker enclosure including a loudspeaker assembly according to claim 1.

13. A spider suitable for use as the spider of claim 1.

14. A method of manufacturing a spider for a loudspeaker, wherein the spider comprises one or more radially extending legs, and the method comprises a step of shaping one or more legs of the spider to follow a line which varies in height above a reference plane, the reference plane being a plane perpendicular to the direction of movement of a voice coil of the loudspeaker, said line comprising first, second and third curves, the second curve being located in between the first and third curves and the amplitude of the first and third curves is greater than the amplitude of the second curve and wherein either the first and third curves are convex and the second curve is concave, or the first and third curves are concave and the second curve is convex; and each concave curve extends from a local maximum to a local maximum via a local minimum and has an amplitude defined as the axial distance between said local minimum and the local maxima, and each convex curve extends from a local minimum to a local minimum via a local maximum and has an amplitude defined as the axial distance between said local maximum and the local minima and in the case that the axial distance between the local maximum/minimum and each of the respective minima/maxima differs, the amplitude shall be taken as the larger of the two axial distances, to produce a spider having a target stiffness versus excursion response.

15. A method of manufacturing a spider according to claim 14, wherein the method includes modifying the amplitude and/or wavelength of said convex and/or concave curves from an original spider design to produce the target stiffness versus excursion response.

* * * * *